United States Patent
Chanko et al.

(10) Patent No.: US 11,002,210 B2
(45) Date of Patent: May 11, 2021

(54) METHOD AND SYSTEM FOR IMPROVING EFFICIENCY OF A PARTICULATE FILTER

(71) Applicant: Ford Global Technologies, LLC, Dearborn, MI (US)

(72) Inventors: Timothy Brian Chanko, Canton, MI (US); Douglas Allen Dobson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/601,534

(22) Filed: Oct. 14, 2019

(65) Prior Publication Data
US 2021/0108586 A1    Apr. 15, 2021

(51) Int. Cl.
| | |
|---|---|
| *F02D 41/14* | (2006.01) |
| *F02D 41/02* | (2006.01) |
| *F01N 3/025* | (2006.01) |
| *F02D 41/12* | (2006.01) |
| *F02D 41/40* | (2006.01) |
| *F02P 5/04* | (2006.01) |
| *F02P 5/15* | (2006.01) |
| *F02D 41/00* | (2006.01) |
| *F02D 41/30* | (2006.01) |

(52) U.S. Cl.
CPC ....... *F02D 41/1466* (2013.01); *F01N 3/0253* (2013.01); *F02D 41/0002* (2013.01); *F02D 41/025* (2013.01); *F02D 41/029* (2013.01); *F02D 41/123* (2013.01); *F02D 41/3005* (2013.01); *F02D 41/401* (2013.01); *F02P 5/045* (2013.01); *F02P 5/1504* (2013.01); *F02D 2200/0812* (2013.01)

(58) Field of Classification Search
CPC .. F02D 41/1466; F02D 41/029; F02D 41/123; F02D 41/401; F02D 41/025; F02D 41/0002; F02D 41/30; F02D 2200/0812; F01N 3/0253; F02P 5/045; F02P 5/1504
See application file for complete search history.

(56) References Cited

U.S. PATENT DOCUMENTS

| | | | |
|---|---|---|---|
| 8,327,628 B2 | 12/2012 | Ruona et al. | |
| 2006/0005534 A1* | 1/2006 | Wirth | F01N 9/002 60/291 |
| 2016/0169148 A1* | 6/2016 | Yokoi | F02P 5/1506 123/299 |
| 2018/0087466 A1* | 3/2018 | Bromberg | F02D 41/068 |
| 2020/0191079 A1* | 6/2020 | Schwaab | F01N 3/023 |

OTHER PUBLICATIONS

Lambert, C. et al., "Gasoline Particle Filter Development," Emission Control Science and Technology, vol. 3, No. 1, Feb. 2017, 7 pages.
Liu, X. et al., "Gasoline Particulate Filter Efficiency and Backpressure at Very Low Mileage," SAE International Technical Paper 2018-01-1259, Apr. 3, 2018, 9 pages.

* cited by examiner

*Primary Examiner* — Brandon D Lee
(74) *Attorney, Agent, or Firm* — Geoffrey Brumbaugh; McCoy Russell LLP

(57) ABSTRACT

An engine system and method for operating an engine that includes a particulate filter is described. In one example, soot loading of a green particulate filter is increased to improve efficiency of the green particulate filter. The soot loading of the green particulate filter may be expedited so that by the time a vehicle reaches a customer or testing facility, the green particulate filter may be operating at a desired efficiency level.

18 Claims, 4 Drawing Sheets

METHOD AND SYSTEM FOR IMPROVING EFFICIENCY OF A PARTICULATE FILTER

BACKGROUND AND SUMMARY

Direct injection gasoline engines may include a particulate filter for removing carbonaceous soot (e.g., soot) from exhaust gases. The particulate filter begins its life free of soot and soot may accumulate over time within the particulate filter as engine exhaust gas flows through the particulate filter. Initially, soot trapping efficiency of the particulate filter may be relatively low; however, as time goes on and soot accumulates within the particulate filter, soot trapping efficiency of the particulate filter may increase. Nevertheless, when a vehicle that includes a particulate filter arrives at a retail sales outlet or a vehicle emissions testing center, the particulate filter soot trapping efficiency may be lower than may be desired. Consequently, the vehicle may initially emit more soot than may be desired and the amount of soot that is emitted from the vehicle may not be representative of the vehicle's long term capability to operate at lower soot output levels.

The inventors herein have recognized the above-mentioned limitations and have developed an engine operating method, comprising: performing a pre-cycle soot loading on a green gasoline particulate filter (e.g., a particulate filter that has not been exposed to engine exhaust for longer than a threshold amount of time) to a predetermined soot loading to increase efficiency of the green gasoline particulate filter via a controller; and after a first regeneration of the green gasoline particulate filter, discontinuing the pre-cycle soot loading.

By loading a particulate filter with soot during a pre-cycle, it may be possible to provide the technical result of reducing an amount of time it takes for a particulate filter to reach a desired soot trapping efficiency. Further, it may be possible to achieve a desired level of particulate filter efficiency before a vehicle in which the particulate filter resides reaches an end customer or a vehicle emissions testing facility so that the vehicle arrives in a desired working condition. The loading of the particulate filter may begin at a vehicle manufacturing site and/or when an engine of the vehicle is started while the vehicle is in transit to a customer. Consequently, the vehicle may arrive at its destination after manufacture in a state where the vehicle's particulate filter is operating with a desired level of soot trapping efficiency.

The present description may provide several advantages. Specifically, the approach may pre-condition a particulate filter before the vehicle in which the particulate filter resides is put into service. As such, the vehicle may arrive at its destination operating as expected. Additionally, the approach may expedite particulate filter efficiency improvement so that the particulate filter operates at a higher efficiency sooner. Further, the approach may be performed automatically without need for human intervention.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
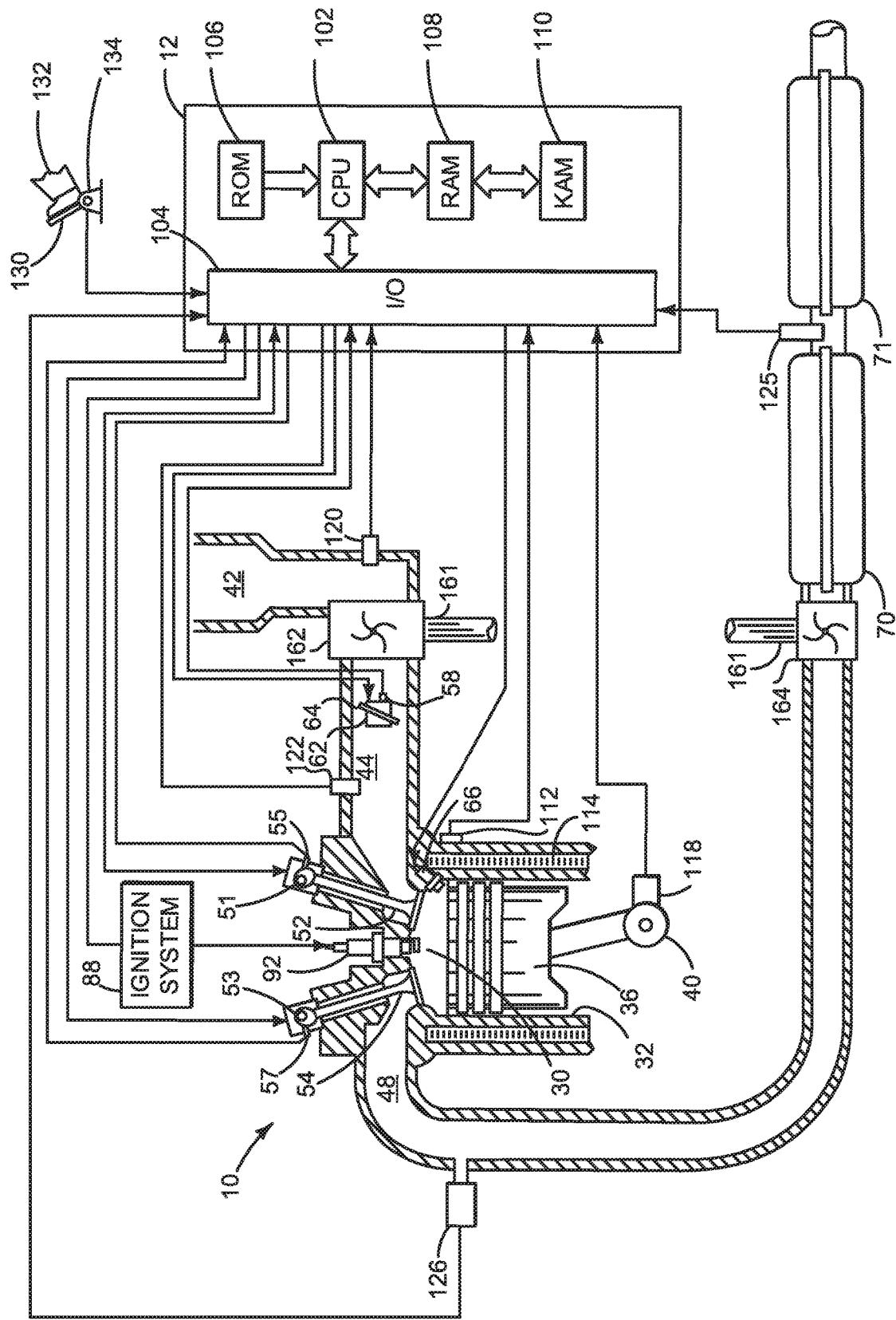
FIG. 1 shows a schematic depiction of an engine.
Figure 2:
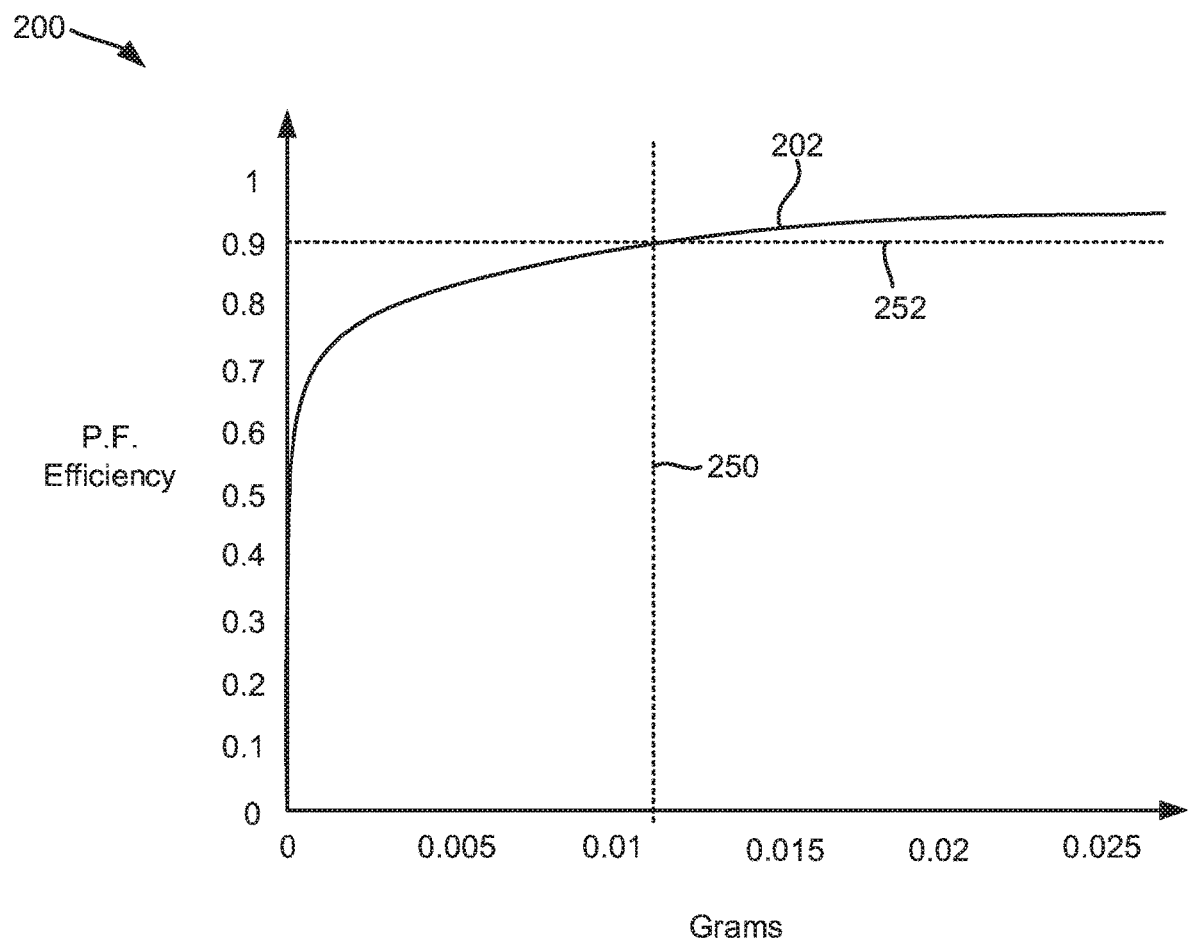
FIG. 2 shows an example particulate filter efficiency plot.
Figure 3:
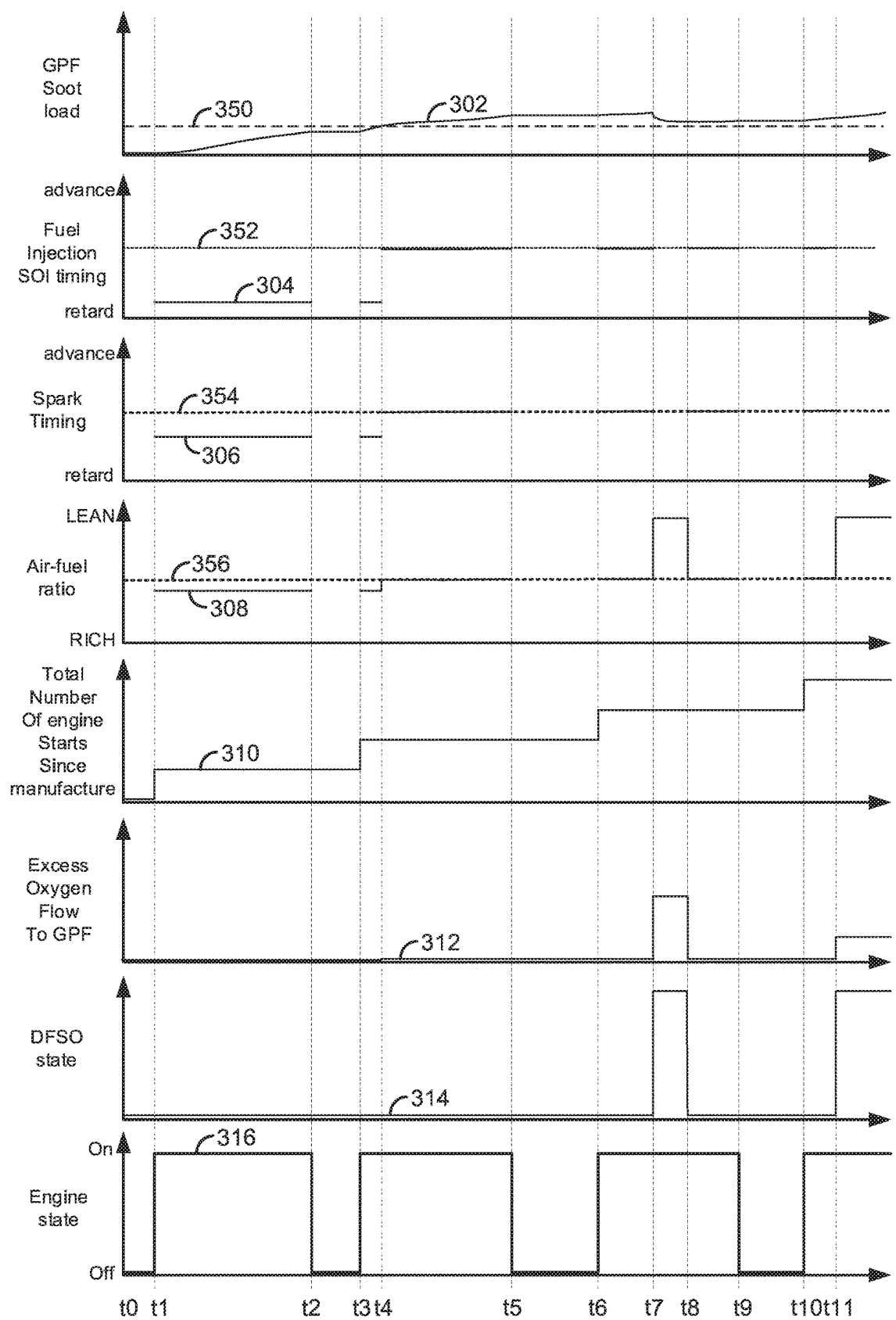
FIG. 3 show an example engine operating sequence according to the method of FIG. 2.
Figure 4:
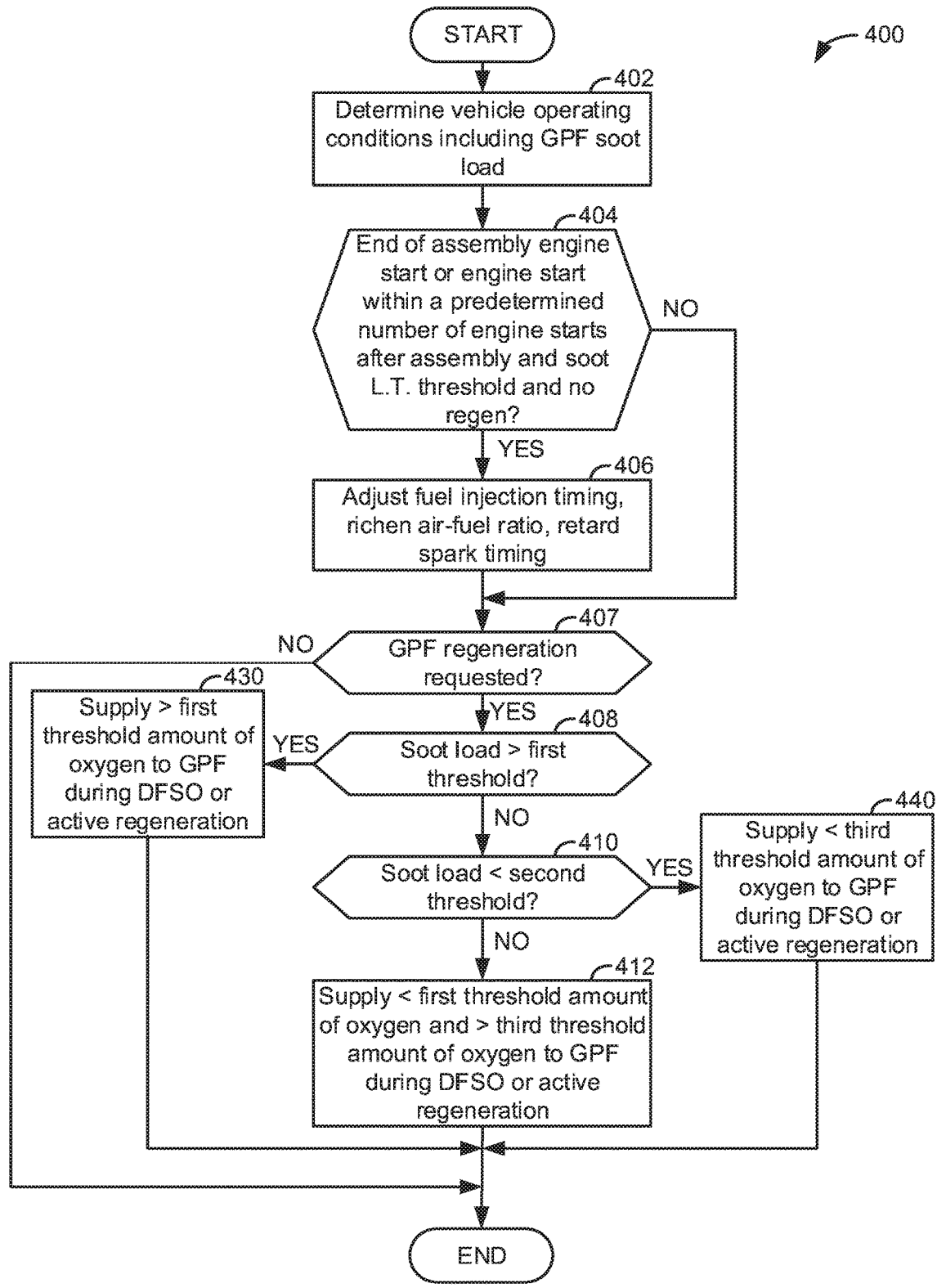
FIG. 4 shows an example method for operating an engine.

The present description is related to operating a spark ignited engine that includes a particulate filter in its exhaust system. One example engine system is shown in FIG. 1. The particulate filter may operate with an efficiency that is a function of a soot load of the particulate filter as shown in FIG. 2. The engine system may be operated as shown in the sequence of FIG. 3. A method for operating an engine that includes a particulate filter in its exhaust system is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage is included so that exhaust gases may bypass turbine 164 during selected operating conditions. Further, a compressor bypass passage may be provided in some examples to limit pressure provided by compressor 162. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. Particulate filter 71 is positioned downstream of converter 70.

A second UEGO 125 is positioned downstream of converter 70 to provide an indication of the oxygen storage state of converter 70.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for a system for controlling an engine, comprising: a vehicle including an engine; an ignition system supplying spark to the engine; a particulate filter in an exhaust system of the engine; and a controller including executable instructions stored in non-transitory memory for retarding fuel injection timing of the engine from a base fuel injection timing of the engine in response to the engine being started less than a threshold actual total number of times since the vehicle was manufactured. The system further comprises additional executable instructions for retarding spark timing of the engine from a base spark timing of the engine in response to the engine being started less than the threshold actual total number of times since the vehicle was manufactured.

In some examples, the system further comprises additional executable instructions for richening an air-fuel ratio of the engine from a base engine air-fuel ratio in response to the engine being started less than the threshold actual total number of times since the vehicle was manufactured. The system further comprises additional executable instructions to adjust an amount of oxygen delivered to the particulate filter in response to a soot load of the particulate filter. The system includes where adjusting the amount of oxygen delivered to the particulate filter includes delivering more than a first amount of oxygen to the particulate filter when a soot load of the particulate filter exceeds a first threshold level. The system includes where adjusting the amount of oxygen delivered to the particulate filter includes delivering less than the first amount of oxygen to the particulate filter when the soot load of the particulate filter is less than the first threshold level, and where adjusting the amount of oxygen delivered to the particulate filter includes delivering more than a second amount of oxygen to the particulate filter when the soot load of the particulate filter is greater than a second threshold level, the second threshold level less than the first threshold level.

Referring now to FIG. 2, a plot of particulate filter efficiency versus soot load of the particulate filter is shown. The vertical axis of the plot represents particulate filter efficiency and the particulate filter efficiency increases in the direction of the vertical axis arrow. The horizontal axis represents soot load of the particulate filter and the soot load of the particulate filter increases in the direction of the horizontal axis arrow. The particulate filter efficiency ranges from 0% to 100% (e.g., 1). The particulate filter soot loading ranges from 0 grams to 0.025 grams.

Solid line 202 represents the particulate filter efficiency as a function of particulate filter soot load. Horizontal line 252 represents where the particulate filter soot trapping efficiency reaches 90%. Vertical line 250 represents the soot load at which the particulate filter soot trapping efficiency reaches 90%. Thus, it may be observed from the intersections of lines 250 and 252 that the particulate filter reaches a soot trapping efficiency of 90% when the soot load within the particulate filter is about 0.011 grams. Thus, to achieve 90% soot trapping efficiency, it may be desirable to load the particulate filter with at least 0.011 grams of soot.

Referring now to FIG. 3, an example prophetic engine and exhaust system operating sequence is shown. The sequence may be provided by the system of FIG. 1 executing instructions of the method shown in FIG. 4. The vertical lines t0-t10 represent specific times of interest in the sequence.

The first plot from the top of FIG. 3 is a plot of gasoline particulate filter (GPF) soot load versus time. The horizontal axis represents time and the vertical axis represents GPF soot load. Time increases from the left side of the figure to the right side of the figure. GPF soot load increases in the direction of the vertical axis arrow. Trace 302 represents GPF soot load. Horizontal line 350 represents a threshold soot load above which particulate filter soot trapping efficiency is greater than 90%.

The second plot from the top of FIG. 3 is a plot of fuel injection start of fuel injection crankshaft angle versus time. The horizontal axis represents time and the vertical axis represents fuel injection start of fuel injection time. Time increases from the left side of the figure to the right side of the figure. Fuel injection start of injection crankshaft angle advances in the direction of the vertical axis arrow. Trace 304 represents engine start of fuel injection crankshaft angle. Horizontal line 352 represents a base start of fuel injection crankshaft angle. For example, start of fuel injection time for a cylinder for a cycle of an engine may begin 260 crankshaft degrees before the cylinder reaches top-dead-center compression stroke during the engine cycle.

The third plot from the top of FIG. 3 is a plot of engine spark timing crankshaft angle versus time. Spark is delivered to a cylinder at the engine spark timing crankshaft angle. The horizontal axis represents time and the vertical axis represents engine spark timing crankshaft angle. Time increases from the left side of the figure to the right side of the figure. Engine spark timing crankshaft angle advances in the direction of the vertical axis arrow. Trace 306 represents engine spark timing crankshaft angle. Horizontal line 354 represents a base start of engine spark timing crankshaft angle.

The fourth plot from the top of FIG. 3 is a plot of an engine air-fuel ratio versus time. The horizontal axis represents time and the vertical axis represents an engine air-fuel ratio. Time increases from the left side of the figure to the right side of the figure. Trace 308 represents the engine air-fuel ratio. Horizontal line 356 represents a stoichiometric engine air-fuel ratio. The engine air-fuel ratio is lean above line 356 and rich below line 356.

The fifth plot from the top of FIG. 3 is a plot of an actual total number of engine starts since the vehicle was manufactured (e.g., a total number of engine starts of a vehicle since manufacture date including end of line tests and engine starts for moving the vehicle). The horizontal axis represents time and the vertical axis represents the total number of engine starts of the vehicle since the manufacture date of the vehicle. Time increases from the left side of the figure to the right side of the figure. The total number of engine starts increases in the direction of the vertical axis arrow. Trace 310 represents the total number of engine starts since vehicle manufacture.

The sixth plot from the top of FIG. 3 is a plot of an amount of excess oxygen that is delivered to the gasoline particulate filter (GPF) versus time. The horizontal axis represents time and the vertical axis represents an amount of excess oxygen flow to the GPF. Time increases from the left side of the figure to the right side of the figure. Trace 312 represents the amount of excess oxygen that is delivered to the GPF.

The seventh plot from the top of FIG. 3 is a plot of deceleration fuel shut off (DFSO) operating state versus time. The horizontal axis represents time and the vertical axis represents the DFSO state of the vehicle. Time increases from the left side of the figure to the right side of the figure. Trace 314 represents the DFSO state. Trace 314 represents the DFSO state of the vehicle.

The eighth plot from the top of FIG. 3 is a plot of engine operating state versus time. The horizontal axis represents time and the vertical axis represents the engine operating state. Time increases from the left side of the figure to the right side of the figure. Trace 316 represents the engine operating state. The engine is operating or on (e.g., rotating and combusting fuel) when trace 316 is at a higher level near the vertical axis arrow. The engine is off (e.g., not rotating and not combusting fuel) when trace 316 is at a lower level near the horizontal axis.

At time t0, the engine is off and the engine has not been started since it has been manufactured. Since the engine is off, fuel injection timing is not present, spark timing is not present, and engine air-fuel ratio is not present. Excess oxygen is not flowing to the GPF and the vehicle is not in DFSO.

At time t1, engine is started for a first time since the engine was manufactured. The engine's soot production level is increased from base engine soot production via retarding engine spark timing from base spark timing, operating the engine with a rich air-fuel ratio, and retarding start of fuel injection timing (e.g., crankshaft angle at which fuel injection is started for a cylinder during a particulate cycle of the cylinder) from base injection timing. The soot load in the GPF begins to increase and the total number of engine starts since engine manufacture is incremented. Excess oxygen flow to the GPF is low and the vehicle is not in DFSO.

At time t2, the engine is stopped and the soot load in the GPF is still below threshold 350. Fuel injection, spark, and engine air-fuel ratio are not present since the engine is stopped and the total number of engine starts since manufacture remains one.

At time t3, the engine is started for a second time and the engine air-fuel ratio is rich to increase engine soot production. The engine spark timing is also retarded from base spark timing and the fuel injection start of fuel injection timing is retarded from base fuel injection timing to increase engine soot production. Increasing the engine soot production increases the amount of soot that is trapped in the GPF, thereby increasing the GPF efficiency. The actual total number of engine starts since vehicle manufacture is increased by one and excess oxygen flow into the GPF is low. The engine is not in DFSO and the GPF soot load begins to increase again.

At time t4, the amount of soot that is trapped in the GPF exceeds threshold 350 so the start of fuel injection timing is advanced to a base start of fuel injection timing, thereby reducing the engine soot output. The engine spark timing is also advanced back to base engine spark timing and the engine air-fuel ratio is adjusted to a stoichiometric air-fuel ratio. The total number of engine starts remains at two and the soot load in the GPF increases at a lower rate. The engine continues to operate without being in DFSO mode. The excess oxygen flow to the GPF is increased to a small amount while the engine operates near a stoichiometric air-fuel ratio.

At time t5, the engine is stopped and the soot load in the GPF is still above threshold 350. Fuel injection, spark, and engine air-fuel ratio are not present since the engine is stopped and the total number of engine starts since manufacture remains one.

At time t6, the engine is started for a third time and the engine air-fuel ratio is stoichiometric to reduce engine emissions. The engine spark timing is at base timing and the fuel injection start of fuel injection timing is at base timing. The GPF soot load is above threshold 350 and the total number of engine starts is incremented to three. The actual total number of engine starts since vehicle manufacture is increased by one and excess oxygen flow into the GPF is low. The engine is not in DFSO and the GPF soot load begins to increase again.

At time t7, the engine remains rotating, but the engine enters DFSO where fuel is not supplied to engine cylinders. The engine may enter DFSO when the vehicle is above a threshold speed and driver demand torque is less than a threshold level. The excess oxygen flow rate to the GPF increases and the soot load in the GPF begins to be reduced as the soot stored in the GPF is oxidized via the excess oxygen flow to the GPF. The fuel injection is ceased, spark timing ceases, and the engine air-fuel ratio is lean due to the engine entering DFSO. The total number of engine starts remains at three.

At time t8, the engine exits DFSO mode and fuel is supplied once again to the engine. Thus, the engine is restarted when exiting DFSO. The engine may exit DFSO in response to an increase in engine load. The engine air-fuel ratio is stoichiometric, the start of fuel injection timing is a base timing, and engine spark timing is a base spark timing. The total number of engine starts remains at three and soot begins to accumulate again in the GPF. The amount of soot trapped in the GPF remains above threshold 350. A small amount of excess oxygen flows to the GPF.

At time t9, the engine is stopped and the soot load in the GPF is still above threshold 350. Fuel injection, spark, and engine air-fuel ratio are not present since the engine is stopped and the total number of engine starts since manufacture remains one. The engine may be automatically stopped or it may be stopped in response to an engine stop request that is generated by a human. At time t10, the engine is started for a fourth time and the engine air-fuel ratio is stoichiometric to reduce engine emissions. The engine spark timing is at base timing and the fuel injection start of fuel injection timing is at base timing. The GPF soot load is above threshold 350. The actual total number of engine starts since vehicle manufacture is increased by one and excess oxygen flow into the GPF is low. The engine is not in DFSO and the GPF soot load begins to increase again.

In this way, soot delivered to the GPF may be increased when soot load in the GPF is less than a threshold so that GPF efficiency may be increased. Further, soot delivered to the GPF may be decreased after the soot load in the GPF is above a threshold level since increasing the soot load of the GPF may provide limited returns. The soot load in the GPF may also be reduced, but remain above the threshold to maintain GPF trapping efficiency above a threshold level.

Referring now to FIG. 4, a method for operating an engine and increasing efficiency of a gasoline particulate filter is shown. At least portions of method 400 may be implemented as executable controller instructions stored in non-transitory memory. Method 400 may operate in cooperation with the system of FIG. 1. Additionally, portions of method 400 may be actions taken in the physical world to transform an operating state of an actuator or device. The method of FIG. 4 may be incorporated into the system of FIG. 1 as executable instructions stored in non-transitory memory.

At 402, method 400 determines vehicle operating conditions including soot loading within the GPF. Vehicle operating conditions may include but are not limited to vehicle speed, total number of engine starts since the time that the vehicle was manufactured, engine speed, engine temperature, and amount of soot stored in the GPF. Method 400 proceeds to 404.

At 404, method 400 judges if the engine is being requested to start a first time since the vehicle was manufactured or if the engine is being requested to be started within a predetermined actual total number of engine starts since a time the engine was manufactured (e.g., within 10 engine starts of when the vehicle was manufactured). Method 400 may also judge if the amount of soot stored in the particulate filter is less than a threshold amount and if regeneration (e.g., reducing the amount of soot stored in the GPF via oxidation of the soot stored in the GPF). If method 400 judges that an engine start is requested and that the engine start is a first engine start since the vehicle was manufactured or that an amount of soot stored in the GPF is less than a threshold amount and that the GPF has not been regenerated since the vehicle was manufactured, then the answer is yes and method 400 proceeds to 406. Method 400 may judge that the GPF is a "green" GPF during such conditions. Otherwise, the answer is no and method 400 proceeds to 408.

If the answer at 404 is yes, method 400 may determine that the vehicle is operating pre-cycle (e.g., before emissions testing) or before delivery to a customer. This determination may be useful to improve GPF soot trapping efficiency so that when the vehicle enters an emissions test or service for a customer or end user, the GPF may be operating as expected.

At 406, method 400 adjusts engine operation to increase engine soot output over a base engine soot output level. In one example, method 400 may adjust one or more of start of fuel injection timing, spark timing, and engine air-fuel ratio. In particular, method 400 may retard spark timing from base spark timing, retard start of fuel injecting timing for engine cylinders from base start of fuel injection timing for the cylinders, and richen the engine air-fuel ratio from a base engine air-fuel ratio so that soot output of the engine may be temporarily raised so that GPF efficiency may be increased. In still other examples, method 400 may maintain engine soot output at baseline levels while increasing the soot amount that is stored in the GPF. The engine soot output may be increased from a base soot output level until soot load of the GPF is greater than a threshold level (e.g., a level where GPF soot trapping efficiency is greater than 90%). The engine soot amount may no longer be increased once the GPF is regenerated a first time since the vehicle was manufactured. Method 400 proceeds to 408.

At 407, method 400 judges whether or not GPF regeneration is requested. GPF regeneration may be requested in response to a soot load that is stored within the GPF being greater than a threshold amount and vehicle operating conditions being conducive to regenerate the GPF. Conducive conditions for regenerating the GPF may include but are not limited to engine temperature greater than a threshold temperature, engine speed greater than a threshold speed, and engine load greater than a threshold load. Further, method 400 may require additional or fewer conditions to determine if GPF regeneration may be requested. If method 400 judges that GPF regeneration is requested, the answer is yes and method 400 proceeds to 408. Otherwise, the answer is no and method 400 proceeds to exit.

At 408, method 400 judges whether or not an amount of soot stored in the particulate filter is greater than a first threshold amount (e.g., 80% of the particulate filter's capacity to store soot within the particulate filter). If method 400 judges that the amount of soot stored in the GPF is greater than the first threshold amount, the answer is yes and method 400 proceeds to 430. Otherwise, the answer is no and method 400 proceeds to 410.

At 430, method 400 supplies greater than a first threshold amount of excess oxygen to the GPF during DFSO or during active GPF regeneration (e.g., regenerating the GPF while the engine is operating via heating the GPF via the engine, operating the engine lean, and operating the engine with retarded spark timing). Method 400 may control the excess amount of oxygen (e.g., oxygen that flows through engine cylinders but does not participate in combustion within the engine's cylinders) that is provided to the GPF via adjusting one or more of fuel injection amount and engine air flow. The engine air flow amount may be adjusted via adjusting a position of the engine's throttle and/or cam timing. The excess oxygen that flows to the GPF may help to oxidize soot that is stored in the GPF. The oxidation of soot that is stored in the GPF may be stopped via reducing excess oxygen flow to the GPF and/or cooling the GPF. The oxidation of soot stored in the GPF may be ceased when the amount of soot stored within the GPF is less than or within a threshold soot storage amount of a third threshold amount of soot stored in the GPF. The third threshold amount of soot stored in the GPF may be an amount of soot that allows GPF soot trapping efficiency to exceed a threshold soot trapping efficiency (e.g., 90% soot trapping efficiency). Method 400 proceeds to exit.

At 410, method 400 judges whether or not an amount of soot stored in the particulate filter is less than a second threshold amount (e.g., 40% of the particulate filter's capacity to store soot within the particulate filter). If method 400 judges that the amount of soot stored in the GPF is less than the second threshold amount, the answer is yes and method 400 proceeds to 440. Otherwise, the answer is no and method 400 proceeds to 412.

At 440, method 400 supplies less than a third threshold amount of excess oxygen to the GPF during DFSO or during active GPF regeneration. The third threshold amount of excess oxygen may be less than the first and second threshold amounts of excess oxygen. The oxidation of soot that is stored in the GPF may be ceased when the amount of soot stored within the GPF is less than or within a threshold soot storage amount of a third threshold amount of soot stored in the GPF. The third threshold amount of soot stored in the GPF may be an amount of soot that allows GPF soot trapping efficiency to exceed a threshold soot trapping efficiency (e.g., 90%). Method 400 proceeds to exit.

At 412, method 400 supplies a second amount of excess oxygen to the GPF that is less than a first threshold amount of excess oxygen and greater than the third amount of excess oxygen. The oxidation of soot that is stored in the GPF may be ceased when the amount of soot stored within the GPF is less than or within a threshold soot storage amount of a third threshold amount of soot stored in the GPF. The third threshold amount of soot stored in the GPF may be an amount of soot that allows GPF soot trapping efficiency to exceed a threshold soot trapping efficiency (e.g., 90%). Method 400 proceeds to exit.

Thus, method 400 may adjust an excess amount of oxygen that is supplied to a GPF to regenerate the GPF when GPF regeneration is requested. The excess amount of oxygen may be used to control the amount of soot that is oxidized within the GPF. In addition, method 400 may temporarily increase engine soot output to increase GPF soot trapping efficiency. The engine soot output may be increased during an end of line engine test so that soot that may flow through the GPF may be processed off board the vehicle.

Thus, the method of FIG. 4 provides for an engine operating method, comprising: performing a pre-cycle soot loading on a green gasoline particulate filter to a predetermined soot loading to increase efficiency of the green gasoline particulate filter via a controller; and after a first regeneration of the green gasoline particulate filter, discontinuing the pre-cycle soot loading. The engine operating method includes where the pre-cycle soot loading includes increasing soot output of an engine over baseline engine soot output. The engine operating method includes where the green gasoline particulate filter is a particulate filter with less than a threshold number of operating hours. The engine operating method includes where the predetermined soot loading is a soot loading of the green gasoline particulate filter where soot trapping efficiency of the green gasoline particulate filter is greater than ninety percent. The engine operating method includes where the first regeneration is performed in response to a soot load within the green gasoline particulate filter being greater than a threshold soot loading, and where the threshold soot loading is greater than the predetermined soot loading.

In some examples, the engine operating method includes where discontinuing the pre-cycle soot loading includes discontinuing the pre-cycle soot loading for a life of the green gasoline particulate filter. The engine operating method includes where the first regeneration is performed during deceleration fuel shut off. The engine operating method includes where the first regeneration is an active regeneration where an air-fuel ratio of an engine is lean and where spark timing of the engine is retarded from nominal spark timing of the engine.

The method of FIG. 4 also provides for an engine operating method, comprising: adjusting at least one of start of fuel injection timing, air-fuel ratio, and spark timing of an engine to increase soot output of the engine over a base engine soot output via a controller in response to a soot loading of a green particulate filter being less than a threshold amount. The engine operating method further comprises ceasing to increase soot output of the engine in response to the soot loading of the green particulate filter being greater than the threshold amount. The engine operating method further comprises adjusting an amount of oxygen flowing to the green particulate filter during deceleration fuel shut-off. The engine operating method includes where the amount of oxygen flowing to the green particulate filter is adjusted via adjusting a throttle. The engine operating method includes where adjusting the start of fuel injection timing includes retarding the start of fuel injection timing. The engine operating method includes where adjusting the air-fuel ratio includes richening the air-fuel ratio.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. An engine operating method, comprising:
  performing a pre-cycle soot loading on a green gasoline particulate filter to a predetermined soot loading before a first regeneration of the green gasoline particulate filter to increase efficiency of the green gasoline particulate filter via a controller; and after a first regeneration of the green gasoline particulate filter, discontinuing the pre-cycle soot loading, where discontinuing the pre-cycle soot loading includes discontinuing the pre-cycle soot loading for a life of the green gasoline particulate filter.

2. The engine operating method of claim 1, where the pre-cycle soot loading includes increasing soot output of an engine over baseline engine soot output.

3. The engine operating method of claim 1, where the green gasoline particulate filter is a particulate filter that has been exposed to engine exhaust gases for less than a threshold number of hours.

4. The engine operating method of claim 1, where the predetermined soot loading is a soot loading of the green gasoline particulate filter where soot trapping efficiency of the green gasoline particulate filter is greater than ninety percent.

5. The engine operating method of claim 1, where the first regeneration is performed in response to a soot load within the green gasoline particulate filter being greater than a threshold soot loading, and where the threshold soot loading is greater than the predetermined soot loading.

6. The engine operating method of claim 1, further comprising selecting an amount of oxygen to supply to the green gasoline particulate filter from a group of three threshold amounts of oxygen, selection of a first amount of oxygen in the group of three threshold amounts of oxygen based on an amount of soot stored in the green gasoline particulate filter being greater than a first threshold, selection of a second amount of oxygen in the group of three threshold amounts of oxygen based on an amount of soot stored in the green gasoline particulate filter being greater than a second threshold, and selection of a third amount of oxygen in the group of three threshold amounts of oxygen based on an amount of soot stored in the green gasoline particulate filter being less than the second threshold.

7. The engine operating method of claim 1, where the first regeneration is performed during deceleration fuel shut off.

8. The engine operating method of claim 1, where the first regeneration is an active regeneration where an air-fuel ratio of an engine is lean and where spark timing of the engine is retarded from nominal spark timing of the engine.

9. A system for controlling an engine, comprising:
a vehicle including an engine;
an ignition system supplying spark to the engine;
a particulate filter in an exhaust system of the engine; and
a controller including executable instructions stored in non-transitory memory for retarding fuel injection timing of the engine from a base fuel injection timing of the engine in response to the engine being started less than a threshold actual total number of times since the vehicle was manufactured, additional executable instructions to adjust an amount of oxygen delivered to the particulate filter in response to a soot load of the particulate filter, where adjusting the amount of oxygen delivered to the particulate filter includes delivering more than a first amount of oxygen to the particulate filter when a soot load of the particulate filter exceeds a first threshold level, and adjusting the amount of oxygen delivered to the particulate filter includes delivering less than the first amount of oxygen to the particulate filter when the soot load of the particulate filter is less than the first threshold level, and where adjusting the amount of oxygen delivered to the particulate filter includes delivering more than a second amount of oxygen to the particulate filter when the soot load of the particulate filter is greater than a second threshold level, the second threshold level less than the first threshold level.

10. The system of claim 9, further comprising additional executable instructions for retarding spark timing of the engine from a base spark timing of the engine in response to the engine being started less than the threshold actual total number of times since the vehicle was manufactured.

11. The system of claim 9, further comprising additional executable instructions for richening an air-fuel ratio of the engine from a base engine air-fuel ratio in response to the engine being started less than the threshold actual total number of times since the vehicle was manufactured.

12. The system of claim 9, further comprising additional executable instructions to perform a pre-cycle soot loading on a green gasoline particulate filter to a predetermined soot loading and to discontinue the pre-cycle soot loading for a life of the green gasoline particulate filter.

13. An engine operating method, comprising:
adjusting at least one of start of fuel injection timing, air-fuel ratio, and spark timing of an engine to increase soot output of the engine over a base engine soot output during a pre-cycle soot loading of a particulate filter via a controller in response to a soot loading of a green particulate filter being less than a threshold amount;
after a first regeneration of the particulate filter, discontinuing the pre-cycle soot loading, where discontinuing the pre-cycle soot loading includes discontinuing the pre-cycle soot loading for a life of the green gasoline particulate filter; and
discontinuing the pre-cycle soot loading for a life of the particulate filter.

14. The engine operating method of claim 13, further comprising ceasing to increase soot output of the engine in response to the soot loading of the green particulate filter being greater than the threshold amount.

15. The engine operating method of claim 13, further comprising adjusting an amount of oxygen flowing to the green particulate filter during deceleration fuel shut-off.

16. The engine operating method of claim 15, where the amount of oxygen flowing to the green particulate filter is adjusted via adjusting a throttle.

17. The engine operating method of claim 13, where adjusting the start of fuel injection timing includes retarding the start of fuel injection timing, and further comprising:
selecting an amount of oxygen to supply to the green gasoline particulate filter from a group of three threshold amounts of oxygen, selection of a first amount of oxygen in the group of three threshold amounts of oxygen based on an amount of soot stored in the green gasoline particulate filter being greater than a first threshold, selection of a second amount of oxygen in the group of three threshold amounts of oxygen based on an amount of soot stored in the green gasoline particulate filter being greater than a second threshold, and selection of a third amount of oxygen in the group of three threshold amounts of oxygen based on an amount of soot stored in the green gasoline particulate filter being less than the second threshold.

18. The engine operating method of claim 13, where adjusting the air-fuel ratio includes richening the air-fuel ratio.

* * * * *